Sept. 26, 1933.   P. CORSELLO   1,928,007
CHEWING GUM WRAPPER
Filed Feb. 9, 1933
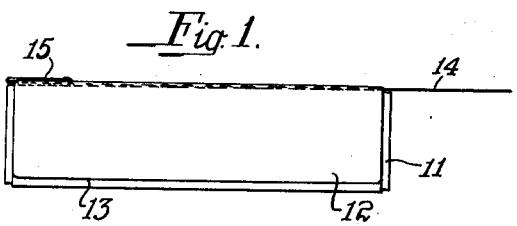
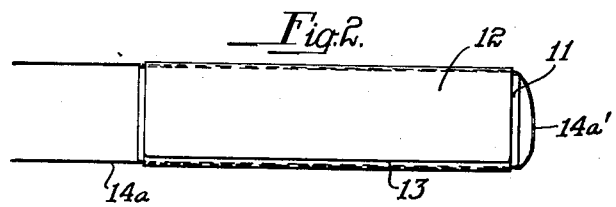
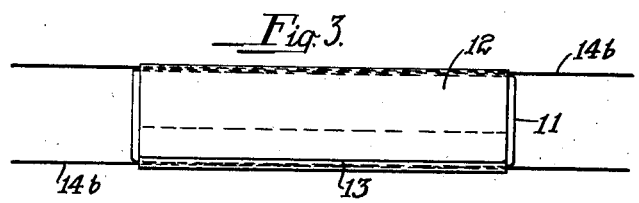
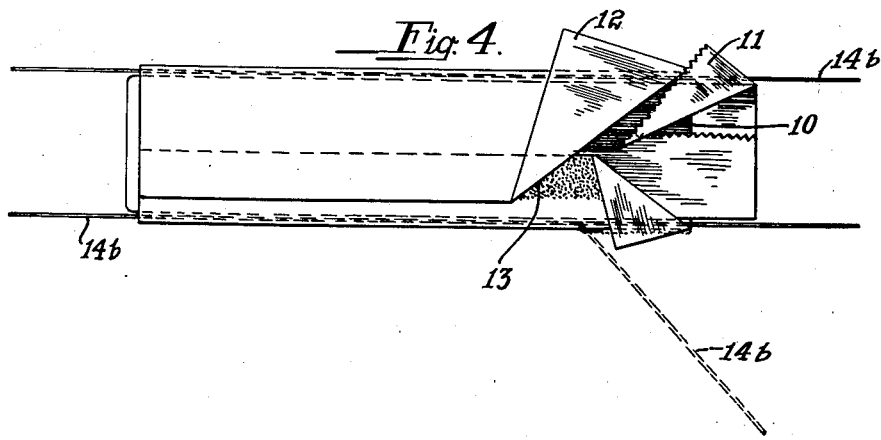
INVENTOR
Philip Corsello
By Green & McCallister
His Attorneys Patented Sept. 26, 1933

1,928,007

UNITED STATES PATENT OFFICE 1,928,007

CHEWING GUM WRAPPER

Philip Corsello, Pittsburgh, Pa.

Application February 9, 1933. Serial No. 655,962

4 Claims. (Cl. 206—47)

This invention relates to a chewing gum wrapper and more specifically to an enclosing envelope for an individual stick of gum which is provided with means for opening the enclosing envelope which means together with the gum itself furnishes means for and method of cleaning teeth.

I am aware that so-called tear strings have been hitherto used for the purpose of opening wrappers, paste-board boxes and the like but in such cases the tear string is used solely for such purposes and has no function in and of itself. I am also aware that tabs with or without perforations have been utilized for opening various types of packages or wrappers but also without there being any utility for the tearing or torn strip in and of itself.

One of the objects of my present invention is the provision of a chewing gum wrapper wherein the enclosing envelope for the waxed-paper or foil covered stick of gum has operatively associated therewith one or more lengths of dental floss.

Another object of my invention is the provision of an enclosing envelope for a stick of gum which is provided with dental floss so operatively associated with the enclosing envelope that it has dual utility for the purposes of a tear string and for the purposes for which dental floss is or should be used.

A further object is to provide an enclosing envelope with dental floss between the enclosing wrapper and the therein-contained wrapped stick of gum in such fashion that the dental floss may be used to open the envelope and to dislodge foreign matter from between the teeth of the user prior to (preferably) chewing the gum.

A still further object resides in the particular manner of associating the dental floss and the gum envelope with regard to structure and utility so as to effect the purposes and advantages of the present invention.

Other and further objects and advantages will either be understood or will be pointed out hereinafter.

In the accompanying drawing:

Figure 1 represents a preferred embodiment of the present invention;

Fig. 2 illustrates a modified arrangement providing a longer piece of dental floss and a more complete opening of the enclosing envelope;

Fig. 3 represents a still further modification wherein two lengths of dental floss are provided one of which, for example, may be used prior to the use of the gum and the other of which may be used afterwards; and Fig. 4 is an enlarged view of the modification of Fig. 3 with parts opened to expose underlying parts.

Similar numerals indicate corresponding parts in the various views.

In general it will be noted that the invention involves four individual but operatively associated parts, these being (1) the stick of gum itself; (2) the waxed paper or foil covering therefor; (3) the outer enclosing envelope for the individual stick of gum; and (4) the dental floss. These four elements will be described in the order named.

The gum itself 10 may be any of the usual kinds or types of chewing gum of which there are many on the market or I may provide, if so desired, a special composition having more effective tooth cleaning properties than the ordinary commercial gums which are in general sold as alleged aids to digestion and for other similar or analogous purposes. The present invention does not, however, per se contemplate the exact composition of the gum itself except that I prefer the use of gum which is provided with appropriate ingredients so that it may have a suitable scouring and cleaning action on the teeth and so that it will be sufficiently gummy or mucilaginous when chewed to attract into itself and entrap the material removed from the teeth whether it be material on the teeth or between the teeth and whether it be material in the nature of a film of material or whether it be material in the nature of particles of food or the like.

In any suitable way, the gum 10 is provided with a covering 11 which in the usual case consists either of a waxed-paper material or of a suitable foil material. Either of these materials is adapted to be used in connection with the present invention or any other material found suitable for the same purpose. Whatever the precise material may be the gum is entirely enfolded within such material to protect it from deteriorating or from becoming contaminated.

The third element is the outer member for the individual stick of gum 10, herein termed an enclosing wrapper, and this member is designated by the numeral 12. This in general is an open-ended envelope which is wrapped around the waxed-paper or foil covering 11 and which is adhesively secured at its overlapping edges as at 13. Usually this enclosing envelope 12 is somewhat shorter than the gum and its inner wrapper so that the latter projects at each end a small amount from the former. The reason for such is to allow the gum to be removed with its waxed-paper or foil wrapper from the enclosing envelope and this is generally accomplished by sliding and pushing the gum out of the envelope, but in some cases both wrappers are more or less simultaneously torn and removed, as is well known.

The fourth element and the element forming with the foregoing members the new combination of the present invention is the dental floss material designated in Fig. 1 by the numeral 14. Referring to Fig. 1 it will be seen that the length of dental floss 14 passes longitudinally of the gum and envelope and between the envelope 12 and the waxed-paper or foil covering 11. One end of the dental floss may be folded over and secured as at 15 and the other end is left free and projecting as is clearly shown. The secured end may be so secured either by the use of suitable mucilage, gelatine or the like or the said end may be held down by the application thereover of a small piece of gummed material of any suitable or desired kind. The dental floss is preferably not otherwise secured to the envelope or gum covering but lies freely therebetween.

In Fig. 2 I have illustrated a modification of Fig. 1 wherein a longer piece of dental floss 14a has been so associated with the enclosing envelope 12 and the waxed-paper or foil covering 11 that the dental floss extends along one side of the gum between the enclosing wrapper and the waxed-paper or foil covering and then crosses by way of a short loop of material 14a' to the other side where it passes back in the same manner to the starting end and so that both ends of the dental floss project from the same end of the envelope. In this modification, the dental floss may or may not be fastened as in Fig. 1, but if desired one end may be secured as explained in connection with Fig. 1.

In Fig. 3 I have illustrated a further modification of the invention wherein a separate length of dental floss 14b passes along each side of the chewing gum between the enclosing wrapper 12 and the waxed-paper or foil covering 11 therewithin. The four ends of the dental floss are shown as free and projecting but I may secure one end of each piece of dental floss as per Fig. 1, if desired, and I may carry this out so that one piece of dental floss is secured at one end of the gum and the other piece of dental floss is secured at the other end of the gum so that there will be one free end projecting in each direction, thus facilitating the operations herein involved.

In the enlarged view of Fig. 4 the construction and relationship of the hereinabove described elements will be more apparent. The chewing gum itself 10 is shown wrapped in waxed-paper or foil covering 11 but with one end thereof partly unfolded and unwrapped for illustrative purposes. The enclosing envelope 12 is also more easily observed and the overlapped secured edges (at 13) are better brought out by the partial turning back of the edges at one end. The positioning and relationship of the dental floss 14b to the enclosing envelope 12 and the waxed-paper or foil covering 11 are enhanced by the enlarged showing and the dotted line position of part of the lower piece of dental floss illustrates the manner of operation thereof.

In operation, the user extracts a piece of gum from the usual package containing five such pieces and each piece is provided with the present invention in one of the manners shown. As is well known the use of chewing gum is probably most beneficial immediately after meals when there is most likely to be foreign matter such as food particles on or between the teeth in addition to any film of material which generally forms as a coating on the teeth at frequent intervals. Were the gum immediately chewed as is the general custom the particles of food between the teeth would be more firmly wedged in position and thus they would not adhere to the gum and be collected except as to some few stray particles which might be accidentally reached.

According to the present invention, however, the stick of gum as shown is opened by pulling on the free end of the dental floss or on any one of the free ends if there be more than one free end. This provides a simple, rapid and effective way of opening the individual stick of gum and at the same time provides a length of dental floss which can be suitably worked between the teeth in proper fashion to dislodge and remove all particles of food thereon or therebetween. Thereafter the gum may be chewed and the free or loosened particles of food or other foreign matter may be quickly and completely collected and assimilated within the gum body which together with the scouring action of the gum on the teeth provides an immediate and efficient method of cleaning the teeth which I believe to be the more important function of the gum, particularly when used according to the present invention.

It will be clear that by following this procedure the teeth will be beneficially affected with the result that decay will be largely eliminated and the teeth will be kept in clean and healthy condition. Any digestive benefits which the chewing of gum may have will not be affected adversely by the practice of the present invention so that where said gum is provided with a pepsin content, for example, the benefits of this will still be entirely available.

It is apparent that the above invention is subject to modifications other than the foregoing and the present disclosure is, therefore, intended more in an illustrative than in a limitative manner and I reserve the right to make such additions, omissions, substitutions and further modifications as may occur to me.

What I claim as new and desire to secure by Letters Patent is:

1. A wrapper for an individual stick of gum comprising a waxed-paper covered stick of gum, an enclosing wrapper therefor and a portion of dental floss between said enclosing envelope and said waxed-paper covered stick of gum, said length of dental floss being secured to said enclosing envelope at one end and having its other end projecting beyond the envelope, whereby said enclosing envelope may be opened and foreign matter removed from between the teeth of the user prior to chewing the gum.

2. A wrapper for an individual stick of gum comprising a waxed-paper covered stick of gum, an enclosing envelope therefor and a portion of dental floss between said enclosing envelope and said waxed-paper covered stick of gum, said portion of dental floss extending along both edges of said envelope and having a short loop at one end and both the ends thereof projecting from the other end of the envelope whereby said enclosing envelope may be opened and foreign matter removed from between the teeth of the user prior to chewing the gum.

3. A wrapper for an individual stick of gum comprising a waxed-paper covered stick of gum, an enclosing envelope therefor and a portion of dental floss between said enclosing envelope and said waxed-paper covered stick of gum at each side thereof, said dental floss thus lying along the two edges of the envelope and having the ends at each side projecting from said envelope whereby said enclosing envelope may be opened and foreign matter removed from between the teeth of the user prior to chewing the gum.

4. A gum wrapper comprising an enclosing envelope for a covered stick of gum, said enclosing envelope consisting of a suitable strip of material folded around said covered stick of gum and having its overlapping edges adhesively secured together, said enclosing envelope having a length of dental floss extending longitudinally between it and the enclosed covered stick of gum, said length of dental floss being so operatively associated with said envelope and wrapped gum that removal of said dental floss opens said envelope and provides means for dislodging foreign matter from between the teeth of the user which foreign matter is accumulated by said gum when it, in its turn, is utilized.

PHILIP CORSELLO.